United States Patent [19]
Luken

[11] Patent Number: 5,357,599
[45] Date of Patent: Oct. 18, 1994

[54] METHOD AND APPARATUS FOR RENDERING POLYGONS

[75] Inventor: William L. Luken, Yorktown Heights, N.Y.

[73] Assignee: International Business Machines Corporation, Armonk, N.Y.

[21] Appl. No.: 922,297

[22] Filed: Jul. 30, 1992

[51] Int. Cl.$^5$ .......................... G06F 7/38; G06F 15/20
[52] U.S. Cl. ...................................... 395/134; 395/123
[58] Field of Search ......................... 395/123, 126, 134; 340/728, 729

[56] References Cited

U.S. PATENT DOCUMENTS

| | | | |
|---|---|---|---|
| 3,816,726 | 6/1974 | Sutherland et al. | 235/152 |
| 4,709,231 | 11/1987 | Sakaibara et al. | 340/729 |
| 4,866,637 | 9/1989 | Gonzalez-Lopez et al. | 364/518 |
| 4,888,712 | 12/1989 | Barkans et al. | 364/522 |
| 4,912,659 | 3/1990 | Liang | 395/134 |
| 4,958,305 | 9/1990 | Piazza | 364/522 |
| 5,051,737 | 9/1991 | Akeley et al. | 340/747 |
| 5,079,719 | 1/1992 | Maillot | 395/134 |
| 5,226,115 | 7/1993 | Fiasconaro | 395/141 |

OTHER PUBLICATIONS

Simple and Efficient 2D and 3D Span Clipping Algorithms, Victor J. Duvanenko, Ronald S. Gyrucsik & W. E. Robbins, Comput. & Graphics, vol. 17, No. 1, pp. 39–54, 1993.

Computer Graphics Principles and Practice, 2nd Edition, James D. Foley et al., Addison-Wesley Publishing Company (1990) pp. 866–873.

Reentrant Polygon Clipping, I. E. Sutherland et al. Jan. 1974, vol. 17, #1 pp. 32–42.

High Performance Polygon Rendering, K. Akeley et al., Computer Graphics vol. 22, #4, Jan. 1988 pp. 239–246.

A New Fast Method for 2D Polygon Clipping, P. Maillot, ACM Transact. on Graphics, vol. II, No. 3, Jul. 1992; pp. 276–290.

*Primary Examiner*—Heather R. Herndon
*Assistant Examiner*—Mike Smith
*Attorney, Agent, or Firm*—Mark S. Walker

[57] ABSTRACT

Shading values are generated for the vertices of a polygon clipped by a view volume without performing unnecessary lighting calculations for polygons lying entirely outside the view volume. Each polygon vertex is transformed and tested to determine whether it is within the view volume. If a tested vertex lies within the view volume, lighting calculations are performed for that vertex. If the polygon lies entirely outside the view volume, no lighting calculations are performed for any of the vertices of the polygon, and only a subset of the coordinate transformation calculation is performed. Complete transformation and lighting calculations are performed for vertices lying outside the view volume only if necessary for determining by interpolation the values for new vertices formed by clipping.

26 Claims, 4 Drawing Sheets

METHOD AND APPARATUS FOR RENDERING POLYGONS

BACKGROUND OF THE INVENTION

1. Field of the Invention

This invention relates to a method and apparatus for transforming, lighting and clipping tile data representing a polygon for purposes of displaying tile polygon on a computer graphics display system.

2. Description of the Related Art a. General

Polygons are widely used in 3-D computer graphics, including computer aided design (CAD), molecular modeling, geometric solid modeling, and architecture. The performance of a computer graphics display may be improved through the ability to represent polygons accurately and efficiently.

A polygon is defined by a sequence of vertex data records, including vertex coordinates and other values such as vertex normal vectors, describing successive vertices of a closed boundary. These vertices are subject to several types of calculations, including transformations, lighting and clipping, before the final step of rasterization. Vertices are thus transformed from an original coordinate system in which the polygons are defined to a coordinate system in which the polygons are displayed or further processed; polygons are typically transformed several times in the course of the their overall processing. At an appropriate stage of transformation, the vertices are "lighted" by generating shading values from normal vector values and other data, as discussed below. At some stage of their processing, polygons are "clipped" to remove any polygon portions extending beyond defined clipping boundaries (generally planes that are orthogonal to the coordinate axes), generating new vertices and edges to replace any removed portions. Transformation, lighting and clipping are generally performed by a processor pipeline known as the transformation pipeline to speed the overall process. Polygons that have been transformed, lighted and clipped are finally rasterized by conversion to a pixel image that is stored in a frame buffer for display on a computer graphics display device.

Polygon clipping is central to this process, since the point at which it is performed in the transformation pipeline can greatly affect both the speed and accuracy of image rendering. Polygon clipping is discussed in such patents and other publications as Hodgman et al. U.S. Pat. No. 3,816,726; Barkans et al. U.S. Pat. No. 4,888,712; Piazza U.S. Pat. No. 4,958,305; Akeley et al. U.S. Pat. No. 5,051,737; Akeley et al., "High-Performance Polygon Rendering", *Computer Graphics*, Vol. 22, No. 4, pp. 239-246 (Aug. 1988); Foley et al., *Computer Graphics: Principles and Practice*, pp. 866-870 (2d ed. 1990); and Sutherland et al., "Reentrant Polygon Clipping", *Communications of the ACM*, Vol. 17, No. 1, pp. 32-42 (Jan. 1974), the disclosures of which are incorporated herein by reference. Transformation and lighting are discussed in the above-identified work of Foley et al., as well as in Gonzalez-Lopez et al. U.S. Pat. No. 4,866,637, the disclosure of which is likewise incorporated herein by reference.

Polygon vertex data may consist of simple vertex records, colored vertex records, or lightable vertex records. In the case of simple vertex records, each vertex is defined by its 2-D (x,y), 3-D (x,y,z), or 4-D homogeneous (wx,wy,wz,w) coordinates. The color of the resulting polygon is usually defined by a single constant color value which is shared by all points used to represent the shape of the polygon.

In the case of colored vertex records, the vertex data also includes a color value in addition to the coordinates found in the simple data records. Although it is possible to define colored vertex records for 2-D vertices, this is not very useful and is rarely encountered in practice. The vertex color values are most commonly derived from the results of illumination calculations on lightable vertex data records. The color values at points between these vertices are generally defined by some sort of interpolation between the vertex color values. Several types of color interpolation may be defined for the interior points of polygons. These methods are called shaded area fill methods or "Gouraud shading", and the resulting polygons are called "Gouraud-shaded polygons".

In the case of lightable vertex records, each vertex includes an explicit or implied reflectance normal vector in addition to the vertex coordinates of the simple vertex records. This type of vertex does not possess a color. Instead, each vertex has "material properties" such as ambient, diffuse, and specular reflection coefficients. In most cases, the same material properties are shared by all vertices and are not specified as part of the individual vertex records. The normal vectors, however, are typically specified independently for every vertex as a means of representing planar approximations to curved surfaces. The normal vectors, the material properties, and a set of light source definitions are used as parameters for lighting calculations which simulate the illumination of the polygon by one or more sources of light. The result of these lighting calculations is a color value equivalent to the color value contained within a colored vertex record.

Polygons may be rendered as hollow polygons, solid or "flat shaded" polygons, Gouraud-shaded polygons, or Phong-shaded polygons.

A hollow polygon is represented by straight lines connecting successive vertices, including a line joining the last vertex to the first vertex. Nothing is done in the interior of the polygon. Hollow polygons are rarely subject to lighting or shading, except for "depth cueing" (which requires no additional vertex data). Consequently, hollow polygons are typically defined using simple vertex records.

In the case of solid or "flat shaded" polygons, every point on the interior of a polygon is represented with a single constant color. This method is easily implemented on raster-based computer graphics display devices and is typically used for representing polygons defined by simple vertex records on raster-based displays.

A Gouraud-shaded polygon is divided into a set of pixels defined by a raster graphics display, and the color of each pixel is determined by interpolating between colors defined at the vertices. The colors at the vertices may be specified either directly through colored vertex records or evaluating lighting equations based on lightable vertex records. This becomes equivalent to the case of solid polygons for simple vertex records. The methods of interpolation are not unique, and several types of Gouraud-shaded area fill methods have been implemented based on various interpolation schemes. These methods generally produce equivalent results for triangles, but yield inconsistent results for polygons with four or more vertices.

A Phong-shaded polygon is divided into a set of pixels defined by a raster graphics display, and the color of each pixel is determined by evaluating lighting equations based on normal vectors and material properties interpolated between vertices. This method requires lightable vertex records, and produces more pleasing (realistic) colors than obtained by applying the Gouraud shading method to the same polygon. The resulting calculations, however, are much more costly than those in which lighting calculations are performed only at the vertices, and the speed of rendering (converting polygons to pixels) is much slower. Consequently, this approach is not generally used when interactive or real-time rendering or animation is required.

b. Clip Invariance

Prior art clipping methods such as that of Sutherland et al. (1974) were designed for the case of hollow polygons defined by simple vertex records. By the mid-1980s, however, the use of raster-based displays began to be extended to interactive 3-D computer graphics, with dedicated circuits for hidden surface removal (the z-buffer), geometry engines for transformations and clipping, and rasterizers capable of Gouraud-shaded area fills. At this point, it became necessary for the clipping logic to handle polygons with colored vertex records. The universally accepted solution to this problem seems to be based on a straightforward extension of the previous methods developed by Sutherland et al. In this case, if the vector joining two successive vertices must be clipped because it crosses some boundary, then the color at the point where the vector crosses this boundary is calculated by simple linear interpolation between the colors at each of the two original (unclipped) vertices. This produces the correct color at this point, but it disregards the consequences at the interior points within the remaining (clipped) portion of the polygon.

Prior art clipping methods do not address the problem of how to clip polygons with colored vertices because the polygons they were concerned with were defined by simple vertex records with hollow area fills. The practice of adding interpolated colors to vertices produced by such clipping methods, while a simple expedient, ignores the basic purpose of clipping, which is to remove the portions of a polygon which are considered invisible because they fall outside a certain region of space. A proper clipping method must preserve every property, including the color, of every pixel within the portion of the polygon which remains visible after clipping. This characteristic is called "clip invariance". Simply interpolating between vertex colors when clipping does not satisfy this requirement. Consequently, when a shaded polygon is clipped using conventional methods, the interior colors depend on how the polygon is clipped, as may be verified easily by drawing a shaded polygon and shifting it until part of it crosses a clipping boundary.

c. Coordination of Lighting and Clipping

In a conventional graphics geometry processing system such as that described by Akeley et al. (1988), each vertex is subject to transformations, then lighting, and then clipping, in that order. This is very inefficient for trivially rejected polygons because the costly lighting calculations, as well as normal vector transformations which are used only for lighting, are performed on every vertex only to be discarded because the polygon is not visible.

As an alternative, a geometry processing system may perform the lighting after clipping, as described further below. Such a system avoids the lighting calculations for trivially rejected polygons. However, by the time the lighting calculations are performed with this system, the original unclipped vertices are no longer available, and the lighting calculations must be performed at the new vertices created by the clipping process for clipped polygons. In addition, the material properties and reflection normals must be interpolated in order to produce lightable vertex records at the points where a polygon boundary crosses a clipping boundary. This is not only inefficient, but fails to reproduce the vertex color resulting from interpolating between the colors obtained by lighting the unclipped vertices. This introduces additional clip-dependent rendering artifacts beyond those described above for clipping of polygons with colored vertex records.

The standard graphics textbook of Foley et al. (1990) suggests at page 868 that a trivial accept/reject test may be inserted between the transformation and lighting stages in order to avoid the costly lighting calculations for trivially rejected polygons. This proposal, however, is deficient in several respects. For example, the authors continue to propose that the reflectance normals defined at each vertex should be transformed prior to the trivial accept/reject step. A more difficult problem is caused by the requirement for an entire primitive (in this case an entire polygon) to pass through each stage before starting the next stage. For example, the disclosed trivial accept/reject test requires that the last vertex be tested before the first vertex reaches the lighting stage. This leads to burdensome requirements for storing the results of each stage, as well as poor load balancing if dedicated specialized hardware is to be assigned to the successive stages.

Existing commercial products all operate on a vertex-by-vertex basis rather than a polygon-by-polygon basis. None of these products can implement the suggestion of Foley et al., which requires that polygons be processed on a polygon-by-polygon basis.

d. Spatial Coherence

Spatial coherence is the property of each point in space being related or correlated to points which are near by. Spatial coherence of polygons implies that knowledge of any one vertex conveys some information about the other vertices within the polygon.

If a polygon has less than 100 pixels per vertex, then the typical distance between vertices must be on the order of 10 pixels or less. The typical distances between clipping boundaries, however, is more like 100 to 1000 pixels. Consequently, the probability that a particular polygon is actually clipped is only on the order of 1 in 100. This implies a high degree of spatial coherence, where each vertex implies a lot about its neighbors. In particular, if the first vertex of a polygon is accepted (passes all clip tests), it is very likely that all vertices within the polygon will be accepted. Likewise, if the first vertex is rejected (fails at least on of the clip tests), then it is likely that the remaining vertices will not only be rejected, but they will probably be rejected for the same reason(s).

Akeley et al. U.S. Pat. No. 5,051,737 discloses a system that appears to take advantage of spatial coherence in clipping by providing special handling of trivially accepted and trivially rejected polygons. However, the Akeley et al. system, like conventional clipping methods, assumes that the transformation and clipping steps are totally independent. Consequently, it requires a complete transformation (x, y, and z) and complete classification with respect to all (6) clipping planes for every vertex, as long as all vertices receive the same classification.

SUMMARY OF THE INVENTION

The present invention avoids lighting calculations and normal vector transformations for trivially rejected polygons while processing polygons on a vertex-by-vertex basis by coupling the lighting calculations with the clipping tests. As each vertex is processed, sufficient information about the preceding vertices is retained to allow correct colors to be determined. For example, if an accepted vertex is encountered following any number of rejected vertices, lighting calculations must be performed for at most two of the previously rejected vertices in addition to the accepted vertex. This eliminates the problem of needing to store the results of transformation and clipping for all vertices in a polygon (as required by Foley et al.). This also eliminates the need to light every vertex and transform every normal vector as required in products that perform lighting before clipping, as well as the rendering artifacts, normal vector interpolation, and material property interpolation problems inherent in products that clip before performing lighting calculations.

This invention takes advantage of spatial coherence by branching to two different processes (FIGS. 5 and 6) depending on whether the first vertex is accepted or rejected. If the first vertex is accepted, the processing is optimized for subsequent accepts- If the first vertex is rejected, subsequent processing is optimized not only for further rejects, but for further rejects of the same type. For example, if the first vertex passes the x clipping tests, but fails the ymax clipping test, then it is sufficient to calculate and test only the transformed y coordinate of subsequent vertices until one passes the ymax clipping test, which is unlikely. This differs from conventional transformation and clipping methods in that the manner in which a vertex is transformed depends on the results of the clip tests for previous vertices. In conventional methods, the transformation and clipping operations are completely independent, and a single fixed transformation method is applied to every vertex without regard to the clipping tests. The present invention improves upon such prior art methods by using the information gained from testing each point to reduce the effort required to transform and test the subsequent points.

The benefits of this aspect of the invention may be obtained for ally type of polygon with small area. Since shaded polygons are typically much smaller than unshaded polygons (because they are used to approximate complex curved surfaces with many small flat areas), the performance improvement is especially apparent when rendering such shaded polygons.

DESCRIPTION OF THE PREFERRED EMBODIMENTS

1. Overview

Figure 1:
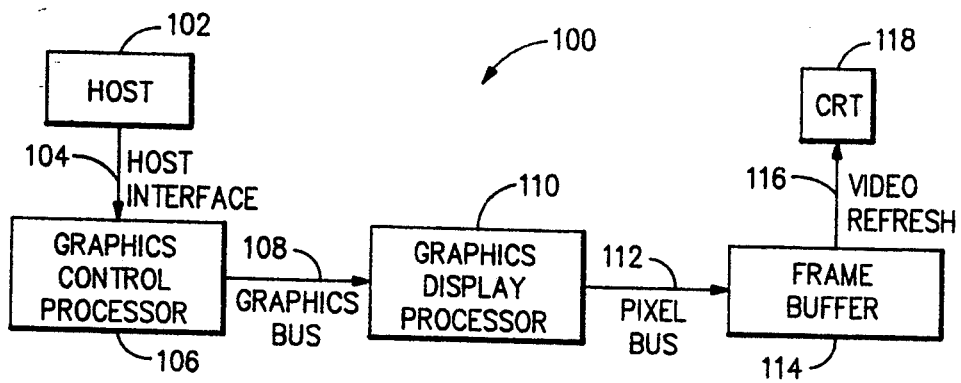
FIG. 1 is a schematic block diagram of a computer graphics system in which the present invention may be incorporated.

FIG. 1 shows a computer graphics display system 100 which may incorporate the present invention. The box 102 labelled "host" represents any general-purpose computer processor, such as that of an IBM 3090, a RISC System/6000, or an IBM PS/2 computer. ("RISC System/6000" and "PS/2" are trademarks of IBM Corporation.) The lost interface 104 represents the communications pathway between the host computer 102 and a graphics control processor (GCP) 106. Host interface 104 may be, for example, an IBM channel and channel control unit, a Micro Channel bus, or other communications facility. ("Micro Channel" is a trademark of IBM Corporation.)

Graphics control processor 106 receives graphics-related commands and data from the host computer 102 via the host interface 104. These commands and data may, for example, specify that a vector is to be drawn between two points, that a polygon with a specified set of vertices is to be filled with a certain color, that a transformation matrix is to be applied to the vertex coordinates before drawing vectors or polygons, etc. Graphics control processor 106 communicates with a graphics display processor 110 via a graphics bus 108. Graphics display processor 110 generates the addresses and color values of all picture elements (pixels) defined by the vertices of vectors and polygons. A pixel bms 112 couples graphics display processor 110 to a frame buffer 114. Frame buffer 114 is a combination of computer memory and digital-to-analog converters (DACs) capable of storing all of the pixels defining a computer graphics screen and generating the video signals on line 116 required to refresh the screen of a suitable monitor, such as a cathode ray tube (CRT) monitor 118.

The basic functions of the graphics control processor 106, graphics display processor 110, and the frame buffer 114 are well-known in the computer graphics art. The graphics control processors of the IBM 6095 graphics system and the IBM RISC System/6000 model 730 workstation provide examples of graphics control processors. The shading processors and drawing processors of these systems provide examples of graphics display processors. Examples of frame buffers are found in the drawing processor and extended pixel memory of these systems.

Graphics display processor 110 retains the screen space coordinates and colors of the preceding three vertices (A, B, C). These would be the three vertices used to draw the previous triangle. Upon receiving the coordinates and color for a new vertex (D), the graphics display processor 110 draws a triangle based on the new vertex and two of the preceding vertices as shown in Table 1. Preferably, graphics display processor 110 supports the following three modes for drawing a new triangle:

1. Polygon mode, in which the new triangle is determined by vertices A, C, and D.
2. Triangle strip mode, in which the new triangle is determined by vertices B, C, and D.
3. Triangle strip swap mode, in which the new triangle is determined by vertices B, C, and D, and vertices B and C are interchanged. This allows the next triangle to share edge BD instead of edge CD (for a triangle strip) or AD (for a polygon).

If these functions are not supported by the graphics display processor 110, then they must be supported by the graphics control processor 106, resulting in a threefold or greater increase in the bandwidth requirements for the graphics bus 108 between the graphics control processor and the graphics display processor.

TABLE 1

Vertex Data in the Graphics Display Processor

| Process | Vertex 1 | Vertex 2 | Vertex 3 |
| --- | --- | --- | --- |
| Previous | A | B | C |
| Polygon | A | C | D |
| T-strip | B | C | D |
| Ts-swap | C | B | D |

This invention relates to the operation of graphics control processor 106 in response to a command such as "draw the polygon specified by the following data."

2. Description of the apparatus

Figure 2:
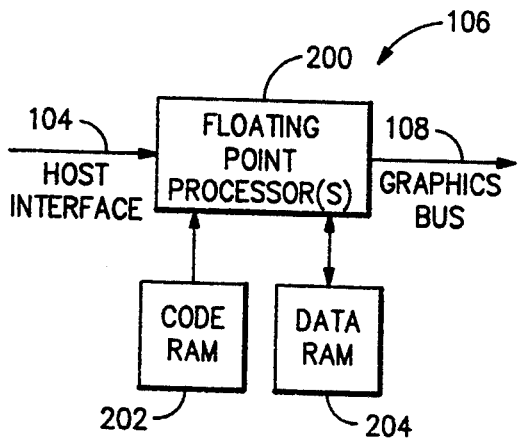
FIG. 2 is a schematic block diagram of the graphics control processor of the system shown in FIG. 1.

The principal components of graphics control processor 106 are shown in FIG. 2. These include one or more floating point processors 200, memory 202 for microcode (including code for the procedures described below), and memory 204 for data. These components are well known in the computer graphics art and will be described only briefly. The floating point processor 200 is a programmable microprocessor capable of performing 32-bit floating point addition, subtraction, and multiplication in addition to typical 32-bit integer operations, loading registers from memory, and storing registers to memory. An example of such a processor is the 10Mhz Weitek chip set consisting of the XL-8136 programmable sequencer, XL-8137 integer processing unit, and XL-3132 floating point processor unit working in combination. These devices are available from Weitek of Sunnyvale, Calif. Another example is the i860 processor which is available from the Intel Corporation of Santa Clara, Calif.

Although it is possible to implement this invention with a single floating point processor 200, the preferred form would include a number of floating point processors capable of operating in parallel. In this case, the data memory 204 may consist of local memory blocks for the exclusive use of each processor 200, as well as shared memory accessible by all of the processors.

Local memory 204 stores transformation matrices, attributes such as colors and line styles, and other information which controls how vectors, polygons and other graphical elements are to be drawn. This information includes clipping boundaries which limit the coordinates of the vertices which may appear within a rectangular portion of a screen.

Sufficient local memory 204 is provided to store up to 5 records, each containing 21 floating point values and one word of flags. The entries in each record may be defined as:

1. (tflag, lflag) transformation and lighting flags;
2. (Xm, Ym, Zm, Wm) homogenous coordinates in modeling coordinates;
3. (Xv, Yv, Zv, Wv) homogenous coordinates in view coordinates;
4. (Xw, Yw, Zw, Ww) homogenous coordinates in world coordinates;
5. (Xd, Yd, Zd) 3-D coordinates in device coordinates;
6. (Nxm, Nym, Nzm) normal vector in modeling coordinates;
7. (Nxw, Nyw, Nzw) normal vector in world coordinates.

The 5 vertices represented by these values will be referred to as vertices A, B, C, D, and E.

3. Operation of the invention

Figure 3A:
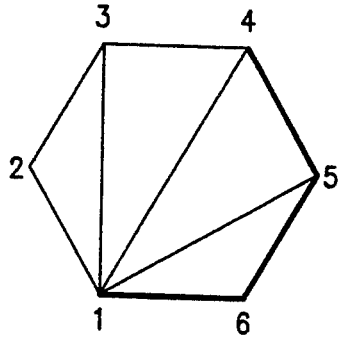
FIGS. 3a-3c show the division of a polygon into triangles in accordance with the present invention.
Figure 3B:
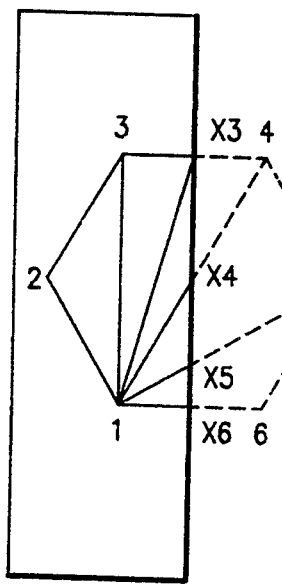
Figure 3C:
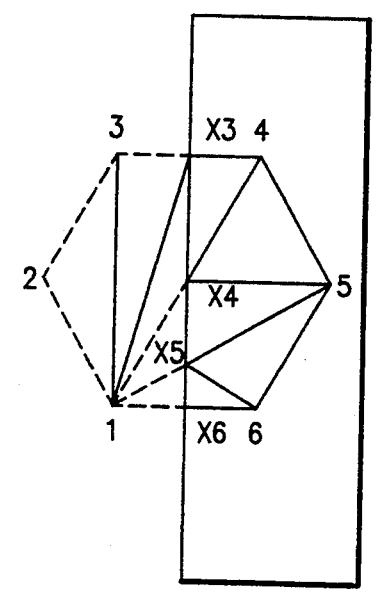
Figure 4A:
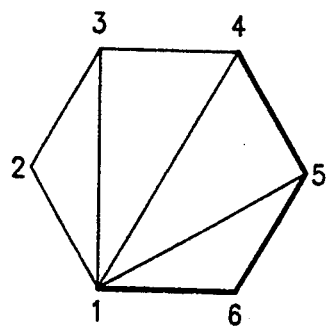
FIGS. 4a-4c show the division of a polygon into triangles in accordance with one teaching of the prior art.

The operation of this invention is based in part on the division of a polygon into a set of triangles, as shown in FIGS. 3a–3c. This is accomplished by connecting the first vertex to each of the other vertices as shown in FIG. 3a. The vertices of the resulting set of four triangles are summarized in Table 2. This is equivalent to the prior art method referred to above when the polygon is not clipped, as shown in FIG. 4a. The result of clipping a polygon depends on whether the first vertex is accepted or rejected.

TABLE 2

Triangulation of an Unclipped Polygon

| Triangle | 1st Vertex | 2nd Vertex | 3d Vertex |
| --- | --- | --- | --- |
| 1 | 1 | 2 | 3 |
| 2 | 1 | 3 | 4 |
| 3 | 1 | 4 | 5 |
| 4 | 1 | 5 | 6 |

If the first vertex is accepted (i.e., the first vertex falls inside the view volume defined by the six clipping planes), then the polygon is divided into triangles as indicated in FIG. 3b. In this case, four new vertices at X3, X4, X5, and X6 are calculated at the points where the line from vertex 3 to vertex 4 and the lines from vertex 1 to vertices 4, 5, and 6 cross the clipping boundary. This results in a total of five triangles, as indicated in Table 3.

TABLE 3

Triangulation of a Clipped Polygon with First Vertex Accepted

| Triangle | 1st Vertex | 2nd Vertex | 3d Vertex |
| --- | --- | --- | --- |
| 1 | 1 | 2 | 3 |
| 2 | 1 | 3 | X3 |
| 3 | 1 | X3 | X4 |
| 4 | 1 | X4 | X5 |
| 5 | 1 | X5 | X6 |

The colors at vertices X3, X4, X5, and X6 are determined by interpolating between the colors at the vertices at the ends of the clipped vectors. If lighting is on, then the lighting calculations must be performed for each vertex prior to clipping, and the resulting lighted colors are interpolated to determine the colors of the clipped triangles. As a result, each clipped triangle is a subset of the corresponding unclipped triangle, and the colors at the interior points within the clipped polygon will be the same as the corresponding points within the unclipped polygon.

Figure 4B:
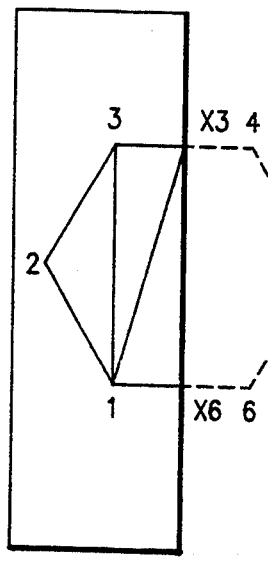

In the prior art method, the same polygon would be divided into only three triangles, as shown in FIG. 4b. This gives a small performance advantage for this situation, but results in incorrect rendering of the triangle with vertices (1, X4, X5) (FIG. 3b). For example, the prior art method determines the color at point X5 by interpolating between the colors at vertices X3 and X6, instead of between vertices 1 and 5. The resulting color at point X5 does not depend on the conditions (coordinates, colors, results of lighting, etc.) at vertex 5. Consequently, in the prior art method, the colors at interior points are not maintained when a polygon is clipped.

If vertex is rejected (falls outside the view volume), the current invention defines a sequence of 5 triangles as shown in FIG. 3c. In this case, the sequence of polygons no longer shares a common first vertex as was found for unclipped polygons and clipped polygons with the first vertex accepted. Instead, the first two vertices of each triangle are the same as the last two vertices of the preceding triangle, as indicated in Table 4. This relationship between successive triangles is identical to that of a triangle strip. This shows that to support clipped polygons, the graphics display processor 110 must be capable of receiving sequential vertices related in either the polygon sequence shown in FIG. 3a and FIG. 3b, or in the triangle strip sequence shown in FIG. 3c. That is, the graphics display processor 110 must support both types of sequences.

TABLE 4

| | Triangulation of a Clipped Polygon with First Vertex Rejected | | |
|---|---|---|---|
| Triangle | 1st Vertex | 2nd Vertex | 3d Vertex |
| 1 | X3 | 4 | X4 |
| 2 | 4 | X4 | 5 |
| 3 | X4 | 5 | X5 |
| 4 | 5 | X5 | 6 |
| 5 | X5 | 6 | X6 |

Figure 4C:
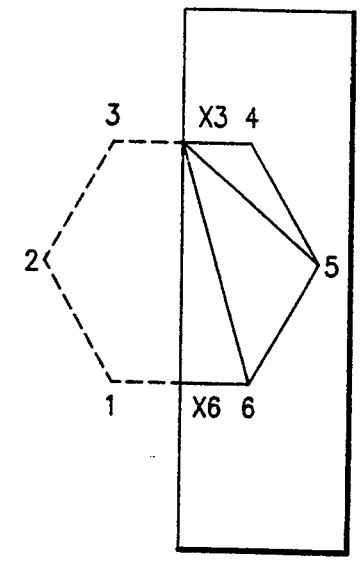

In the prior art method referred to above, a polygon with the first vertex rejected is rendered as the union of three triangles, as shown in FIG. 4c. In this case, the first vertex is replaced with tile first accepted vertex. As was seen for the polygon with tile first vertex accepted, the resulting triangles are not contained within the triangles used to render the unclipped polygon, and the colors at the interior points are not the same as those of the corresponding points of the unclipped polygon.

4. First Rendering Procedure

Figure 5:
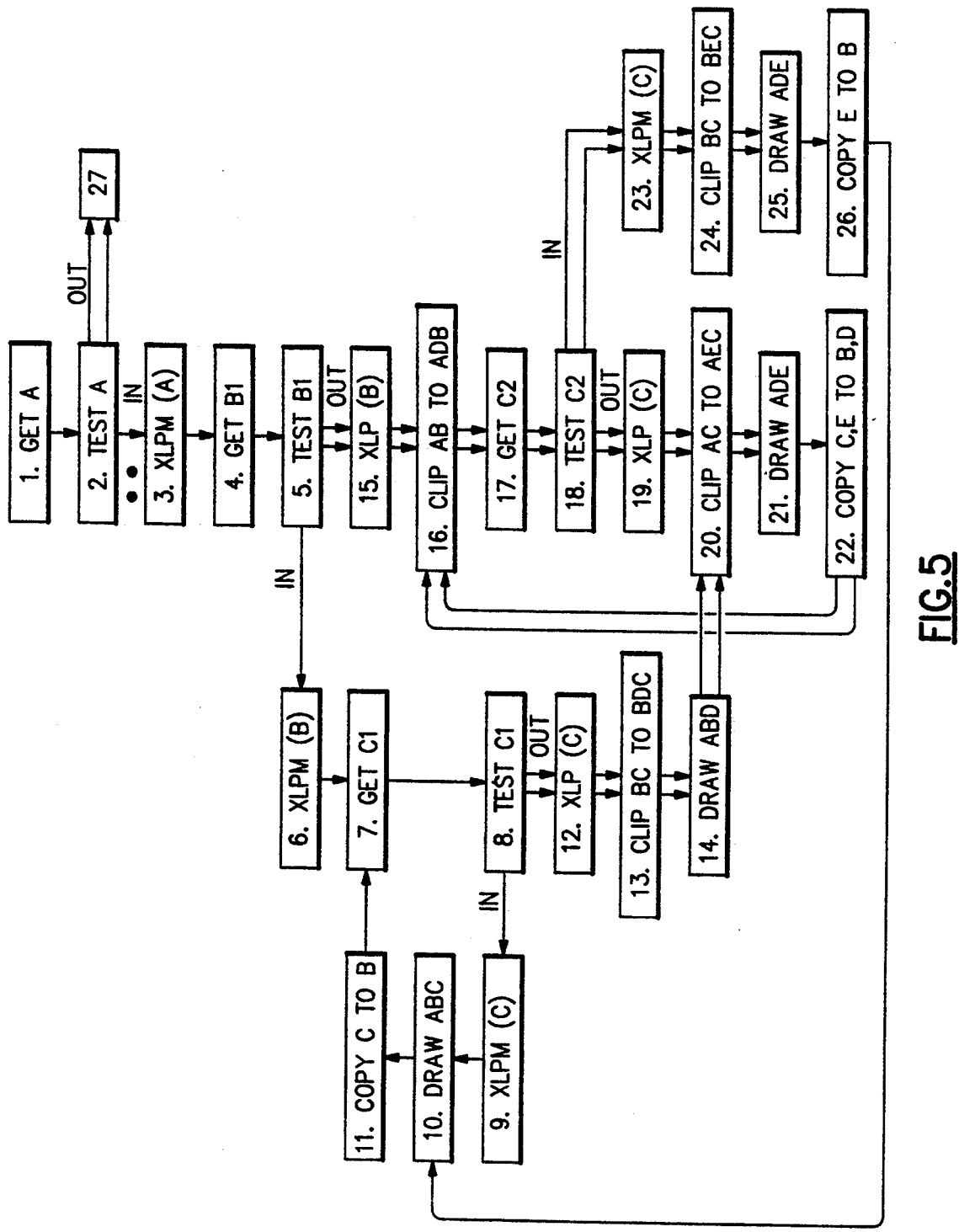
FIG. 5 is a flow diagram of one procedure for processing a polygon in the case where the initial vertex is accepted.
Figure 6:
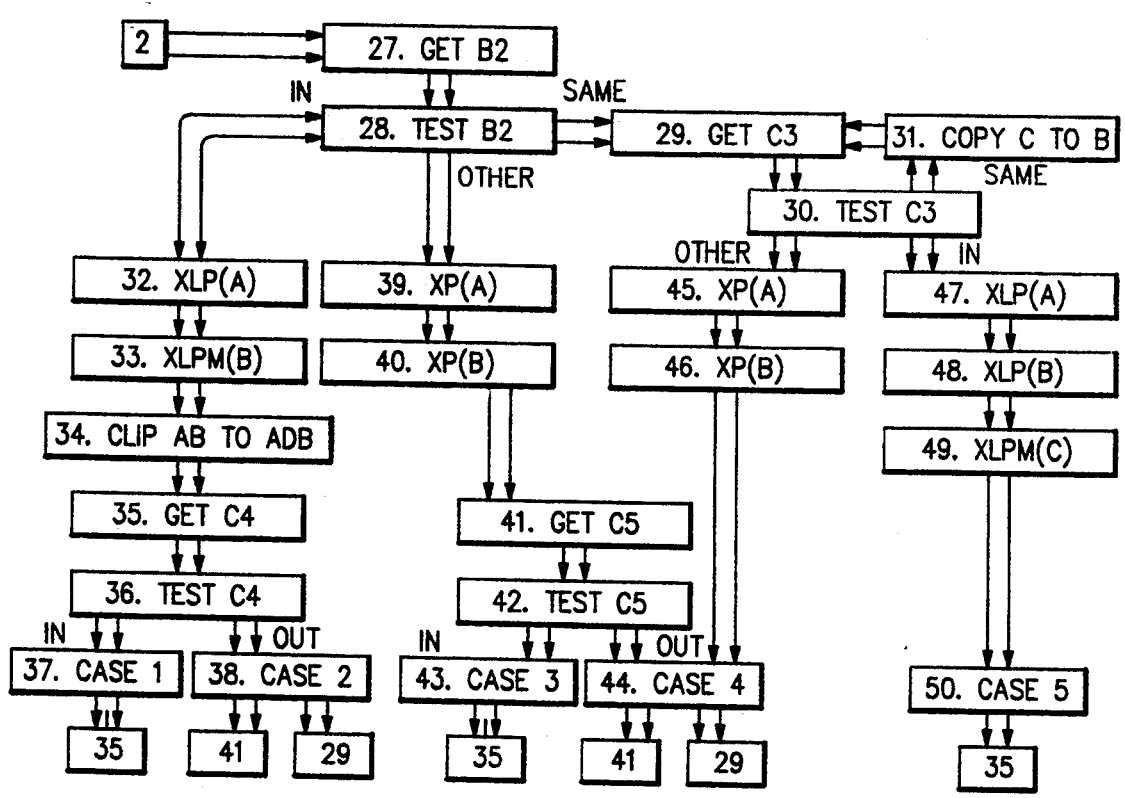
FIG. 6 is a flow diagram of one procedure for processing a polygon in the case where the initial vertex is rejected.

The operation of one code embodiment of this invention is summarized in FIGS. 5 and 6. FIG. 5 covers the processing of the first vertex and subsequent vertices when the first vertex has been accepted (i.e., the first vertex falls inside the view volume defined by tile six clipping planes). FIG. 6 covers the processing of all vertices following the first vertex when the first vertex is rejected (falls outside the view volume).

The following sequence of operations is applied to the vertices of each triangular subarea of a polygon:

1. Get A

Processing starts at this step in response to a command or instruction to start drawing a polygon. At this point, the data representing the coordinates and normal vector for the first vertex are received or loaded from an appropriate source (memory, registers, input FIFO, or other) and stored in memory 204 as the modeling coordinate values (Xm, Ym, Zm, Wm) and (Nxm, Nym, Nzm) for vertex A. The transformation and lighting flags (tflag, lflag) for vertex A are also cleared at this point. The transformation flags will be set (to 1) whenever the coordinates are fully transformed from modeling coordinates to view coordinates. The lighting flag will be set to 1 when the lighting equations are evaluated for the corresponding vertex.

The input data is most likely to be obtained from an input FIFO when processing a simple polygon drawing primitive. In other cases, such as a sphere primitive or trimmed nonuniform rational b-spline (NURBS) surface, the input may be obtained from another process on the graphics control processor 106, possibly running on another processor.

2. Test A

In this stage, the coordinates of vertex A are transformed from modeling coordinates to view coordinates by a 4×4 homogenous transformation T. This transformation is the product of the current modeling and viewing transformations (M, V). The effects of this transformation may be summarized as:

$$Xv = T11*Xm + T12*Ym + T13*Zm + T14*Wm;$$

$$Yv = T21*Xm + T22*Ym + T23*Zm + T24*Wm;$$

$$Zv = T31*Xm + T32*Ym + T33*Zm + T34*Wm;$$

$$Wv = T41*Xm + T42*Ym + T43*Zm, T44*Wm.$$

The resulting values are subjected to the following six tests:
1. If $Xv > Wv*Xmax$ then go to 2a.
2. If $Xv < Wv*Xmin$ then go to 2b.
3. If $Yv > Wv*Ymax$ then go to 2c.
4. If $Yv < Wv*Ymin$ then go to 2d.
5. If $Zv > Wv*Zmax$ then go to 2e.
6. If $Zv < Wv*Zmin$ then go to 2f.

This set of tests defines seven possible results. Six of these results correspond to rejection of the vertex. These six results are represented by the double arrows labelled "out" coming from step 2 in FIG. 5. The two arrows shown in the figure represent six separate paths. Only two arrows are shown (rather than six arrows) to avoid cluttering the diagram. Further processing of these results is specified for step 27.

The seventh result from this step is indicated by the single arrow labelled "in" passing from step 2 to step 3. In this case, the first vertex is inside the view volume defined by the boundaries Xmin, Xmax, Ymin, Ymax, Zmin, and Zmax.

In a conventional system, the transformation step is completed first, followed by the six tests. As an alternative, these operations may be performed in the following order:
1. Calculate the transformed value of Wv.
2. Calculate the transformed value of Xv.
3. If $Xv > Wv*Xmax$, go to 2a
4. If $Xv < Wv*Xmax$, go to 2b
5. Calculate the transformed value of Yv.
6. If $Yv > Wv*Ymax$, go to 2c
7. If $Yv < Wv*Ymax$, go to 2d
8. Calculate the transformed value of Zv.
9. If $Zv > Wv*Zmax$, go to 2e
10. If $Zv < Wv*Zmax$, go to 2f In this case, if a vertex is rejected because it is outside the range of Xmin to Xmax, then the transformation of the y and z components may be avoided. This will be most useful in processing a large number of small polygons. In such a case, all vertices of most polygons are expected to lie in the same half-space defined by each of the six view clipping planes. Consequently, if Xv>Wv*Xmax for the first vertex, the same condition is very likely for all subsequent vertices of the same polygon, and there is no need to compute the transformed y and z components of any vertex of the resulting polygon.

The normal vector is not transformed in this step.

3. XLPM (A)

This step consists of transforming (X) the coordinates and normal vector for vertex A from modeling coordinates to world coordinates, performing all lighting calculations (L) required by the current lighting model, applying the perspective projection (P) to the view coordinates for this vertex, and mapping (M) the projected coordinates into device coordinates (integer pixel or subpixel values).

The results of this step are not required immediately, and it may be advantageous to assign this task to another processor. In a shared memory multiprocessor system, it would be sufficient to instruct another processor to perform this task, without performing any additional data transfers. When this task is completed, a command to start a polygon may be sent to the graphics display processor 110, followed by the device coordinate (x,y,z) and color data for vertex A.

4. Get B1

The data representing the coordinates and normal vector for the second vertex are received or loaded from an appropriate source (memory, registers, input FIFO, or other) and stored in memory 204 as the modeling coordinate values (Xm, Ym, Zm, Wm) and (Nxm, Nym, Nzm) for vertex B. The transformation and lighting flags (tflag, lflag) for vertex B are also cleared at this point.

5. Test B1

In this stage, the coordinates of vertex B are transformed from modeling coordinates to view coordinates by a 4×4 homogenous transformation T, as in step 2. This step branches into seven paths. Six of these paths, represented by the double arrows labelled "out", correspond to a rejected vertex. Processing of these vertices continues with step 3.5. The seventh branch, represented by the arrow labelled "in", corresponds to a vertex inside the view volume.

6. XLPM (B)

As in step 3, the coordinates of vertex B are transformed (X) from modeling coordinates to world coordinates, lighted (L), projected (P), and mapped (M) to device coordinates. The resulting device coordinate (x,y,z) and color data are sent to the graphics display processor 110.

7. Get C1

If additional vertex data for the current polygon remains to be processed, then the data representing the coordinates and normal vector for the next vertex are received or loaded from an appropriate source (memory, registers, input FIFO, or other) and stored in memory 204 as the modeling coordinate values (Xm, Ym, Zm, Wm) and (Nxm, Nym, Nzm) for vertex C. The transformation and lighting flags (tflag, lflag) for vertex C are also cleared at this point.

If there is no further data, a command to end the current polygon ,nay be sent to the graphics display processor 110 and the processing of the current polygon is terminated.

8. Test C1

The coordinates of vertex C are transformed from modeling coordinates to view coordinates by a 4×4 homogenous transformation T, as in step 2. This step branches into seven paths. Six of these paths, represented by the double arrows labelled "out", correspond to a rejected vertex. Processing of these vertices continues with step 12. The seventh branch, represented by the arrow labelled "in", corresponds to a vertex inside the view volume.

9. XLPM(C)

As before, the coordinates of vertex C are transformed (X) from modeling coordinates to world coordinates, lighted (L), projected (P), and mapped (M) to device coordinates. The resulting device coordinate (x,y,z) and color data are sent to the graphics display processor 110.

10. Draw ABC

Upon receiving the coordinates for vertex C, the graphics display processor 110 may generate the set of pixels representing the triangle defined by vertices A, B, and C. In principle, this requires no further action by the graphics control processor 106. If necessary, the graphics control processor 106 ,nay assist the graphics display processor 110 through the calculation of slopes and other parameters required to prepare for this triangle. After drawing this triangle, the graphics display processor 110 may replace the data for vertex B with the corresponding data for vertex C.

11. Copy C to B

The data maintained by the graphics control processor 106 for vertex C is copied to the addresses assigned to vertex B. This may be eliminated by replacing step 11 with the following three steps:
7b. Get B3,
8b. Test B3,
9b. XLPM(B),
10b. Draw ACB.

Step 8b would branch to seven paths, six of which would continue with steps analogous to steps 12 to 14, and the seventh (inside) would continue with step 9b.

12. XLP (C)

This step is similar to step 9, except that the vertex coordinates are not ,napped (M) to device coordinates, and no data is sent to the graphics display processor 110. This step may be implemented with six separate paths for each of the six ways that vertex C may have been rejected. All six paths would be identical, except that the paths for x and y rejection must include instructions to complete the transformation from modeling coordinates to view coordinates.

13. Clip BC to BDC

Figure 7A:
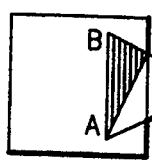
FIGS. 7a-7h illustrate the various ways in which a view volume can clip a triangle.

At this point, vertex B is inside the view volume and vertex C is outside the view volume. The point where the vector BC crosses the view volume boundary is then calculated, as indicated in FIG. 7a. The results are stored as the new D vertex. The colors for the new D vertex may then be interpolated between the colors calculated for the C vertex in step 12, and the color of the B vertex. This step may be implemented with six separate paths determined by the result of step 8.

14. Draw ABD

The triangle defined by vertices A, B, and D may now be drawn, as shown in FIG. 7a. This should be accomplished by sending the new D vertex to the graphics display processor 110 in polygon mode. This step may be implemented with six separate, but equivalent paths determined by the result of step 8. Processing then continues with step 20.

15. XLP (B)

This step is similar to step 3, except that the vertex coordinates are not mapped (M) to device coordinates, and no data is sent to the graphics display processor 110. This step may be implemented with six separate paths for each of the six ways that vertex B may have been rejected. All six paths would be identical, except that the paths for x and y rejection must include instructions to complete the transformation from modeling coordinates to view coordinates.

16. Clip AB to ADB

Figure 7B:
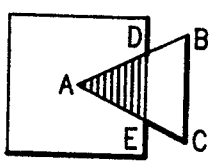

At this point, vertex A is inside the view volume and vertex B is outside the view volume. The point where the vector AB crosses the view volume boundary is then calculated and the results are stored as the new D vertex, as indicated in FIG. 7b. The colors for the new D vertex are then interpolated between the colors calculated for the A vertex in step 3, and the color of the B vertex calculated in step 15.

17. Get C2

If additional vertex data for the current polygon remains to be processed, then the data representing the coordinates and normal vector for the next vertex are received or loaded from an appropriate source (memory, registers, input FIFO, or other) and stored in memory 204 as the modeling coordinate values (Xm, Ym, Zm, Wm) and (Nxm, Nym, Nzm) for vertex C.

If there is no further data, a command to end the current polygon may be sent to the graphics display processor 110 and the processing of the current polygon is terminated.

18. Test C2

The coordinates of vertex C are transformed from modeling coordinates to view coordinates by a 4'4 homogenous transformation T, as in step 2. This step consists of six entry paths corresponding to the six ways the preceding vertex (B) ,nay have been rejected. Each of these six entries branches into seven paths. Six of these paths, represented by the double arrows labelled "in", correspond to cases where vertex C is inside the view volume. These six paths are represented by the double arrows to step 23.

The remaining 36 paths, correspond to cases where vertex B and vertex C are both rejected. These 36 paths may be combined into six paths based on how vertex C was rejected, and processing continues with step 19.

19. XLP (C)

This step is similar to step 3, except that the vertex coordinates are not mapped (M) to device coordinates, and no data is sent to the graphics display processor 110.

20. Clip AC to AEC

The point where the vector AC crosses the view volume boundary is then calculated and the results are stored as the new E vertex, as indicated in FIG. 7b. The colors for the new E vertex are then interpolated between the colors calculated for the A vertex in step 3, and the color of the C vertex calculated in step 19 or step 12.

21. Draw ADE

The polygon defined by vertices A, D, and E is rendered at this point. In the simplest case, this polygon is a triangle, as shown in FIG. 7b. In this case, this area may be drawn by sending vertex E to the graphics display processor 110 in polygon mode. In some cases, the path from vertex D to vertex E must pass through one or more corners of the 3-D view volume. In these cases, the coordinates and colors for each of the corner vertices must be calculated and sent to the graphics display processor 110 in polygon mode prior to vertex E.

22. Copy C, E to B, D

The data for vertex C is copied to the addresses reserved for vertex B, and the data for vertex E is copied to the addresses reserved for vertex D. Processing then continues with step 16, with six paths corresponding to the six ways that vertex C may have been rejected.

23. XLPM (C)

As in step 3, the coordinates of vertex B are transformed (X) from modeling coordinates to view coordinates, lighted (L), projected (P), and mapped (M) to device coordinates, but The resulting device coordinate (x,y,z) and color data are not sent to the graphics display processor 110.

24. Clip BC to BEC

Figure 7C:
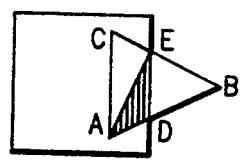

The point where the vector BC crosses the view volume boundary is then calculated and the results are stored as the new E vertex, as indicated in FIG. 7c. The colors for the new E vertex are then interpolated between the colors of the B and the color of the C vertex.

25. Draw ADE

The polygon defined by vertices A, D, and E is rendered at this point. In the simplest case, this polygon is a triangle, as shown in FIG. 7c. In this case, this area may be drawn by sending vertex E to the graphics display processor 110 in polygon mode. In some cases, the path from vertex D to vertex E must pass through one or more corners of the 3-D view volume. In these cases, the coordinates and colors for each of the corner vertices must be calculated and sent to the graphics display processor 110 in polygon mode prior to vertex E.

26. Copy E to B

The data for vertex E is copied to the addresses reserved for vertex B, and the processing continues with step 10.

The path formed by steps 1 through 11, including the loop formed by steps 7 through 11, constitutes the trivial accept case. That is, all three vertices of a triangle are contained within the view volume. This is the most important part of the method, and must be implemented for optimal performance. After step 3, the remaining paths, including steps 12 through 26, correspond to clipped polygons. These paths are expected to be traversed by relatively few polygons, especially when rendering a large number of small polygons. In principle, these paths should also be implemented for optimal performance, but the actual implementation of these paths is expected to have little effect on overall performance.

If the first vertex is rejected, the subsequent vertices are processed as indicated in FIG. 6. The following steps are used to process these vertices:

27. Get B2

The data representing the coordinates and normal vector for the second vertex are received or loaded from an appropriate source (memory, registers, input FIFO, or other) and stored in memory 204 as the modeling coordinate values (Xm, Ym, Zm, Wm) and (Nxm, Nym, Nzm) for vertex B. The transformation and lighting flags (tflag, lflag) for vertex B are also cleared at this point.

28. Test B2

This step has six entry points based on how the previous point (vertex A) was rejected. In each case, the x,y,z component responsible for the rejection is transformed and tested first. For example, if vertex A was rejected based on the Zmin clipping boundary, then the Z component of vertex B is computed and compared to the Zmin clipping boundary. If vertex B is rejected on the basis of the same boundary used to reject vertex A, then the processing continues with step 29. Otherwise, the other components of B may be calculated and the other clipping boundaries may be tested. If vertex B is rejected based on a clipping boundary not tested for vertex A, then vertex A may be tested to determine whether vertex A would also be rejected based on the second clipping boundary. If so, processing may continue with step 29. If vertex B is rejected on the basis of a clipping boundary other than one used to reject vertex A, then processing continues with step 39. Otherwise (vertex B is accepted), processing continues with step 32.

In principle, there are six paths into step 32 and thirty paths into step 39. These paths may be implemented with specialized procedures for each case, or the path may be represented by values of the clipping codes for vertices A and B. The six paths into step 26 should each be implemented with specialized procedures in order to get the best possible performance.

29. Get C3

The data representing the coordinates and normal vector for the next vertex are received or loaded from an appropriate source (memory, registers, input FIFO, or other) and stored in memory 204 as the modeling coordinate values (Xm, Ym, Zm, Wm) and (Nxm, Nym, Nzm) for vertex C. The transformation and lighting flags (tflag, lflag) for vertex C are also cleared at this point. This step includes six equivalent paths depending on the clipping boundary used to reject the preceding vertices.

30. Test C3

This step has six entry points based on how the previous points (vertex A and vertex B) were rejected. In each case, the x,y,z component responsible for the rejection is transformed and tested first. For example, if vertex A was rejected based on the Zmin clipping boundary, then the Z component of vertex C is computed and compared to the Zmin clipping boundary. If vertex C is rejected on the basis of the same boundary used to reject vertex A, then the processing continues with step 31. Otherwise, the other components of C may be calculated and the other clipping boundaries may be tested. If vertex C is rejected on the basis of a clipping boundary other than one used to reject vertex A, then processing continues with step 45. Otherwise (vertex C is accepted), processing continues with step 47.

In principle, there are six paths into step 47 and thirty paths into step 45. These paths may be implemented with specialized procedures for each case, or the path may be represented by values of the clipping codes for vertices A, B, and C. The six paths into step 31 should each be implemented with specialized procedures in order to get the best possible performance.

31. Copy C to B

The data for vertex C is copied to the addresses reserved for vertex B, and the processing continues with step 29. This should be implemented as six separate but equivalent paths to achieve maximum performance.

32. XLP(A)

The coordinates for vertex A are transformed (X) from modeling coordinates to view and world coordinates, the lighting equations (L) are calculated for vertex A, and the perspective projection (P) is applied to vertex A.

33. XLPM(B)

The coordinates for vertex B are transformed (X) from modeling coordinates to view and world coordinates, the lighting equations (L) are calculated for vertex B, and the perspective projection (P) is applied to vertex B, and the results are mapped (M) to screen coordinates.

34. Clip AB to ADB

Figure 7D:
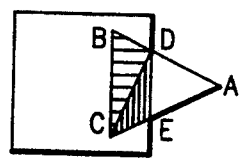
Figure 7E:
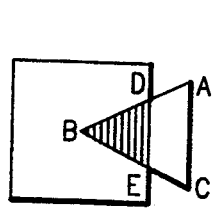
Figure 7F:
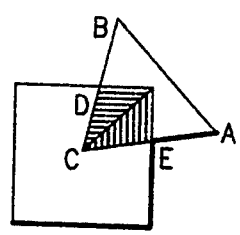

At this point, vertex A is outside the view volume and vertex B is inside the view volume. The point where the vector AB crosses the view volume boundary is then calculated and the results are stored as the new D vertex, as indicated in FIG. 7d and FIG. 7f. The colors for the new D vertex are then interpolated between the colors calculated for the A vertex in step 32, and the color of the B vertex calculated in step 33.

35. Get C4

The data representing the coordinates and normal vector for the next vertex are received or loaded from an appropriate source (memory, registers, input FIFO, or other) and stored in memory 204 as the modeling coordinate values (Xm, Ym, Zm, Wm) and (Nxm, Nym, Nzm) for vertex C. The transformation and lighting flags (tflag, lflag) for vertex C are also cleared at this point. This step may include six equivalent paths depending on the clipping boundary used to reject vertex A.

36. Test C4

The coordinates for vertex C are transformed to view coordinates and compared to the six clipping boundaries. If the vertex passes all of the clipping tests, processing continues with step 37. Otherwise, processing continues with step 38.

37. Case 1

This step includes all calculations needed to process a triangle with vertex A rejected, and vertices B and C accepted. An example of this case is shown in FIG. 7d. As a minimum, this includes calculating the point (E) where vector AC crosses tile view volume boundary, drawing the triangles BDC and DCE in triangle strip mode, and copying tale date for vertex C and E into the addresses reserved for vertices B and D. Additional calculations are required when one or more corners of the view volume fall within this area.

Processing then continues with step 35.

38. Case 2

This step includes all calculations needed to process a triangle with vertices A and C rejected, and vertex B accepted. An example of this case is shown in FIG. 7e. As a minimum, this includes calculating the point (E) where vector BC crosses the view volume boundary, drawing the triangle BDE in triangle strip mode, and copying the date for vertex C into the addresses reserved for vertex B. Additional calculations are required when one or more corners of the view volume fall within this area.

If vertex C was rejected on the basis of the same clipping boundary used to reject vertex A, processing continues with step 29. Otherwise, processing then continues with step 41.

39. XP (A)

The coordinates for vertex A are transformed (X) from modeling coordinates to view and world coordinates and the perspective projection (P) is applied to vertex A. No lighting or mapping calculations are performed.

40. XP (B)

The coordinates for vertex A are transformed (X) from modeling coordinates to view and world coordinates and the perspective projection (P) is applied to vertex A. No lighting or mapping calculations are performed.

41. Get C5

The data representing the coordinates and normal vector for the next vertex are received or loaded from an appropriate source (memory, registers, input FIFO, or other) and stored in memory 204 as the modeling coordinate values (Xm, Ym, Zm, Wm) and (Nxm, Nym, Nzm) for vertex C. The transformation and lighting flags (tflag, lflag) for vertex C are also cleared at this point.

42. Test C5

The coordinates for vertex C are transformed to view coordinates and compared to the six clipping boundaries. If the vertex passes all of the clipping tests, processing continues with step 43. Otherwise, processing continues with step 44.

43. Case 3

This step includes all calculations needed to process a triangle with vertices A and B rejected on the basis of differing boundaries, and vertex C accepted. An example of this case is shown in FIG. 7f. As a minimum, this includes calculating the point (E) where vector AC crosses the view volume boundary, rendering the area CDE, and copying the date for vertex C into the addresses reserved for vertex B. Because vertices A and B have been rejected by differing boundaries, vertex D must be connected to vertex E by a path which includes at least one corner (X). In this case, the region CDE may be rendered by two or more triangles (CDX .... CXE) defined by sending the corner vertices and vertex E to the graphics display processor 110 in polygon mode.

Processing then continues with step 35.

44. Case 4

Figure 7G:
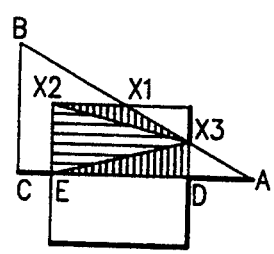

This step includes all calculations needed to process a triangle with vertices A, B, and C rejected on the basis of two or more clipping planes. An example of this case is shown in FIG. 7g. The triangle ABC may be rejected or partially rendered depending on the locations of vertices A, B, and C. This step requires clipping the triangle ABC to the view volume. If the triangle is not rejected, the residual portion may be rendered as the union of one or more triangles drawn in triangle strip mode, based on where the vectors AB, BC, and CA cross the view volume boundaries.

If the vertices A and C were rejected based on the same clipping boundary, processing may continue with step 29. Otherwise, the data for vertex C is copied into the addresses reserved for vertex B, and processing continues with step 41. The addresses reserved for vertices D and E may be used to store the points where vector AC crosses the view volume boundaries.

45. XP (A)

The coordinates for vertex A are transformed (X) from modeling coordinates to view and world coordinates and the perspective projection (P) is applied to vertex A. No lighting or mapping calculations are performed.

46. XP (B)

The coordinates for vertex B are transformed (X) from modeling coordinates to view and world coordinates and the perspective projection (P) is applied to vertex B. No lighting or mapping calculations are performed.

47. XLP (A)

The coordinates for vertex A are transformed (X) from modeling coordinates to view and world coordinates, the lighting equations (L) are calculated for vertex A, and the perspective projection (F) is applied to vertex A, unless the transformation and lighting flags indicate that these calculations have already been performed.

48. XLP (B)

The coordinates for vertex B are transformed (X) from modeling coordinates to view and world coordinates, the lighting equations (L) are calculated for vertex B, and the perspective projection (P) is applied to vertex B, unless the transformation and lighting flags indicate that these calculations have already been performed.

49. XLPM (C)

The coordinates for vertex C are transformed (X) from modeling coordinates to view and world coordinates, the lighting equations (L) are calculated for vertex C, and the perspective projection (P) is applied to vertex C, and the results are mapped (M) to screen coordinates.

50. Case 5

Figure 7H:
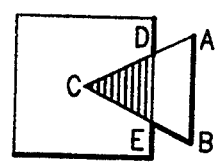

This step includes all calculations needed to process a triangle with vertices A and B rejected based on the same clipping boundary, and vertex C accepted. An example of this case is shown in FIG. 7h. As a minimum, this includes calculating the point (E) where vector AC crosses the view volume boundary, drawing the triangle CDE in triangle strip mode, and copying the data for vertices C and E into tile addresses reserved for vertices B and D. Additional calculations are required when one or more corners of the view volume fall within this area.

Processing then continues with step 35.

The path formed by steps 27 through 31 forms the trivial rejection loop, where all vertices lie outside the view volume. This path must also be implemented for optimal performance, especially tile cases where all vertices are rejected based on the same boundary. After step 28, the remaining paths, including steps 32 through 50, correspond to polygons which are clipped, or which may be clipped. These paths are expected to be traversed by relatively few polygons, especially when rendering a large number of small polygons. In principle, these paths should also be implemented for optimal performance, but the actual implementation of these paths is expected to have little effect on overall performance.

4. Alternative Rendering Procedure

Figure 8:
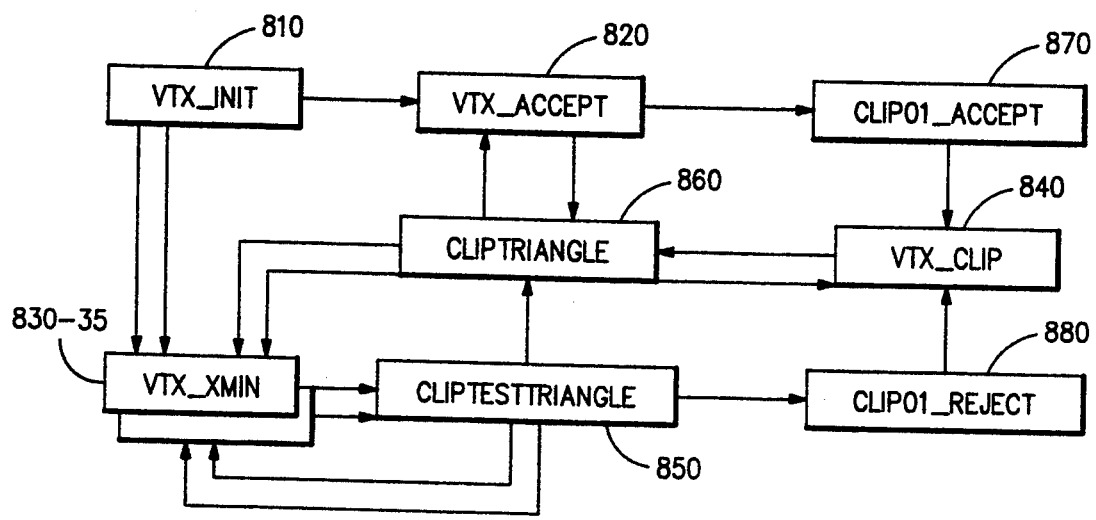
FIG. 8 is a flow diagram of an alternative procedure for processing a polygon.

FIG. 8 is a flowchart of an alterative embodiment in which the code in memory 202 (FIG. 2) has been organized into modules for performing the various transformation, lighting, clipping and testing operations. Double arrows represent six paths corresponding to the six clipping boundaries: xmin, xmax, ymin, ymax, zmin, zmax.

Vtx_init (810) processes the first vertex in a manner similar to that of steps 1-2 of FIG. 5. This function performs a complete coordinate transformation. If the first vertex is accepted, this function performs the lighting calculations for the vertex and passes control to Vtx_accept (820) for processing subsequent vertices. Otherwise, it passes control to one of six functions Vtx_xmin ... Vtx_zmax (830-835) based on the first failed clip test.

Vtx_accept (820) is optimized for trivial accepts. This function performs a complete coordinate transformation and lighting calculation for the vertex being processed, in a manner similar to that of steps 3-11 of FIG. 5. If a vertex is accepted, subsequent vertices continue to be processed by Vtx_accept (820). If a vertex is rejected, the function calls either Clip01_accept (870) (for a second vertex) or ClipTriangle (860) and then passes control to Vtx_clip (840) for subsequent vertices.

Vtx_xmin ... Vtx_zmax (830-835) are optimized for trivial rejects for each of the six clipping boundaries. These functions each perform a partial coordinate transformation based on the indicated clipping boundary, in a manner similar to that of steps 27-31 of FIG. 6. If a vertex is rejected for the indicated clipping boundary, subsequent vertices continue to be processed by the same function. If a vertex is not rejected for the indicated clipping boundary, control passes to ClipTestTriangle (850).

Vtx_clip (840) handles vertices following a clipped triangle or a clipped starting vector. This function performs a complete coordinate transformation and lighting calculation for the vertex being processed, then calls ClipTriangle (860).

ClipTestTriangle (850) classifies the current triangle (i.e., the triangle formed by the first vertex, the most recently processed vertex and the current vertex) if the current vertex cannot be rejected based on the clipping boundary that was used to reject the preceding vertex; if the current vertex is the second vertex, ClipTestTriangle (850) similarly classifies the starting vector from the first vertex to the second vertex. If the triangle or starting vector can be trivially rejected based on one of the six clipping boundaries, this function passes control to the appropriate function of the set Vtx_xmin ... Vtx_zmax (830-835). If the current vertex is the second vertex and the starting vector cannot be trivially rejected, this function calls Clip01_reject (880). If the current vertex is the third or a later vertex and the triangle cannot be trivially rejected, this function performs complete transformation and lighting calculations for the current vertex and the two indicated previous vertices, then calls ClipTriangle (860).

ClipTriangle (860) clips a triangle to the current clipping boundaries. Vertex colors determined by lighting calculations are interpolated to the new vertices defined by the clipping calculations. If the leading edge of this triangle (i.e., the edge extending from the current vertex to the first vertex) is trivially accepted, this function passes control to Vtx_accept (820) for subsequent vertices. On the other hand, if the leading edge of this triangle is trivially rejected, this function passes control to the appropriate member of Vtx_xmin ... Vtx_zmax (830-835) for subsequent vertices. Otherwise, control passes to Vtx_clip (840) for subsequent vertices.

Clip01_accept (870) handles the second vertex when it is rejected following acceptance of the first vertex, in a manner similar to that of step 15 of FIG. 5. Clip01_reject (880) handles the second vertex when the first and second vertices cannot both be rejected on the same clipping boundary. These functions both pass control to Vtx_clip (840) for processing subsequent vertices.

In the embodiment shown in FIG. 8, the normal vector transformation is considered to be part of the lighting calculations. Therefore, the normal vector is not transformed unless the lighting calculations are performed.

In this embodiment, graphics control processor 106 (FIGS. 1-2) includes memory 204 (FIG. 2) for storing data values associated with three vertices. These are designated as Vertex 0, Vertex 1, and Vertex 2 (or the "current vertex"). These data values include the original (untransformed) coordinates and normal vector for each vertex. In addition, these data values include the transformed coordinates, a summary of clipping tests ("clip codes"), and the color values determined by the lighting calculations for any vertex processed by Vtx_accept, Vtx_clip, or ClipTriangle, as well as any accepted vertex processed by Vtx_init. The operation of the functions ClipTestTriangle and ClipTriangle are determined by the data values for these three vertices.

Vertex data values for the first vertex (i.e., any vertex processed by Vtx_init) are always stored as Vertex 0. Vertex data values for subsequent vertices are stored as Vertex 2 until the processing of this vertex is completed. Upon completion of the processing of each vertex, the data values for the "current vertex" (Vertex 2) are stored as the data values for Vertex 1.

This procedure can be be modified to support the processing of a strip of triangles defined by a sequence of vertices in which each set of three consecutive vertices represents a triangle. In this case, upon completion of the processing of each vertex after the first, the data values for the current vertex (Vertex 2) are stored as the data values for Vertex I, where the value of I is initially set to I=1 by Vtx_init and updated as I(new)=1-I(previous) for each subsequent vertex,

5. Summary

This invention operates by processing each vertex in a manner which eliminates unnecessary calculations in order to achieve best possible performance, especially for vertices which fall outside the designated range of coordinates allowed on the resulting computer graphics display. This invention uses novel methods for eliminating lighting and transformation calculations for rejected vertices, affording high performance and requiring a minimal amount of resources.

Although this invention is principally concerned with polygons defined with either colored vertex records or lightable vertex records, and represented using Gouraud-shaded area fill methods, the concepts are easily extended to Phong-shaded polygons, where similar benefits may be obtained. Further, while the above description relates to polygons, similar techniques, using the same or fewer resources, may also be used to render triangle strips, vectors (polylines), and polypoint drawing primitives. Similar methods, requiring a modest increase in memory, may also be used for rendering quadrilateral meshes.

What is claimed is:

1. In a computer graphics system in which a graphics primitive representing a polygon within a defined view volume is converted by a display processor to a shaded image for display on a display surface, said polygon having an ordered set of vertices each defined by vertex data, each successive pair of vertices defining an edge of the polygon, a method of rendering said polygon comprising the steps of:
   (a) dividing said polygon into triangular subareas, each vertex of said subareas being a vertex of said polygon;
   (b) generating clipped subareas representing the intersections of said subareas with said view volume, by testing a first vertex of said subareas against said defined view volume and by processing the remaining set of vertices in accordance with the result of testing the first vertex, and generating vertex data for any newly created vertices of said clipped subareas by interpolation from the vertex data defined for the vertices of the edge of said polygon intersecting said view volume; and
   (c) sending the vertex data for said clipped substrate to said display processor to generate a shaded image of said polygon.

2. A method as in claim 1 in which said triangular subareas share a first vertex of said ordered set of vertices of the polygon as a common vertex.

3. A method as in claim 2 in which the vertices of said polygon are processed sequentially, vertex data for the first vertex of said polygon being stored at a first location, vertex data for the most recently processed vertex of said polygon being stored at a second location, and vertex data for the vertex of said polygon currently being processed being stored at a third location.

4. A method as in claim 3 in which vertex data is transferred from said third location to said second location upon completion of processing of a vertex of said polygon.

5. A method as in claim 3 in which vertex data for a first new vertex is stored at a fourth location and vertex data for a second new vertex is stored at a fifth location.

6. A method as in claim 2 in which each of said clipped subareas comprises one or more triangles representing the intersection of the unclipped subarea with the view volume.

7. A method as in claim 6 in which said triangles are successively generated, each pair of successively generated triangles having two vertices in common.

8. A method as in claim 7 in which said triangles share the first vertex of said polygon as a common vertex if said first vertex is within said view volume.

9. A method as in claim 7 in which said display processor is sent vertex data for one new vertex for each triangle generated, said display processor being operative to generate a shaded image based upon the vertex data for said new vertex together with retained vertex data for vertices previously sent to said processor.

10. A method as in claim 9 in which said display processor is operable in a first mode to generate a shaded image based upon the first vertex together with the two most recent vertices sent to said processor and in a second mode to generate a shaded image based upon the three vertices most recently sent to said processor.

11. A method as in claim 1 in which said vertex data includes vertex coordinates and normal vector values which may be processed to generate shading values.

12. A method as in claim 11 in which said display processor is responsive to successively provided vertex coordinate and shading values.

13. A method as in claim 1 in which said generating step (b) includes the steps of:
   (1) processing the vertex data defined for the vertices of the unclipped subareas to generate shading values; and
   (2) generating shading values for any newly created vertices of the clipped subareas by interpolation from the shading values defined for the vertices of the corresponding unclipped subareas.

14. In a computer graphics system in which a graphics primitive is converted to an image for display on a display surface, said primitive having vertices defined by vertex data, said image being generated within a rectangular view volume defined by a plurality of clipping boundaries, a method of testing said vertices against said clipping boundaries as a preliminary to rendering said primitive for display on said surface, comprising the steps of:
   (a) successively testing a vertex of said primitive against each of said plurality of clipping boundaries to determine whether said vertex is within said boundaries;

(b) if the tested vertex is outside one of said plurality of clipping boundaries, rejecting the vertex and testing a new vertex against the same one of said plurality of clipping boundaries;

(c) repeating step (b) for each vertex of said primitive, testing each new vertex only against said one of said plurality of clipping boundaries, until a vertex is found to be within said one of said plurality of clipping boundaries;

(d) if said new vertex is within said one of said plurality of clipping boundaries, testing said new vertex against each of the remaining of said plurality of clipping boundaries; and (e) sending a test result for said tested vertices to a rendering process.

15. A method as in claim 14 in which said primitive represents a polyline.

16. A method as in claim 15 in which said primitive represents a polygon.

17. A method as in claim 14 in which said vertices are defined in a first coordinate system and wherein the step of successively testing includes the steps of:

transforming said vertex data to a second coordinate system having coordinate axes and testing said transformed vertex data against said clipping boundaries, each of said clipping boundaries being defined in terms of a particular coordinate axis of said second coordinate system and wherein the step of testing a new vertex includes the steps of transforming said vertex data to a second coordinate system and testing said transformed vertex data against said same clipping boundary.

18. A method as in claim 17 in which said transforming and testing steps are performed separately for each of the axes of said second coordinate system.

19. In a computer graphics system in which a graphics primitive representing a polygon within a defined view volume is converted to a shaded image by a display processor responsive to successively provided vertex coordinates and shading values, said polygon having an ordered set of vertices each defined by vertex data, each successive pair of vertices defining an edge of the polygon, the vertex data for each vertex including vertex coordinates and normal vector values which may be processed to generate a shading value, a method of rendering said polygon comprising the steps of:

(a) testing the first vertex of said polygon to determine whether it is within said view volume;

(b) if said first vertex is within said view volume;
  (1) processing the vertex data defined for said first vertex to generate a shading value for said vertex and sending the processed vertex data to said display processor;
  (2) for each subsequent vertex of said polygon:
    (A) determining whether the vertex is within said view volume;
    (B) if the vertex is within said view volume, processing the vertex data defined for the vertex and sending the processed vertex data to said display processor;
    (C) if the vertex is outside said view volume, (i) processing the vertex data defined for the vertex; (ii) generating vertex data for a new vertex on the boundary of said view volume by interpolation from the processed vertex data for the tested vertex and said first vertex; and (iii) if convex, sending the vertex data generated for the new vertex to said display processor, if concave, determining a viewable area and sending the vertex data generated for viewable new vertex data to said display processor;

(c) if said first vertex is outside said view volume:
  (1) for each vertex of said polygon after the second vertex;
    (A) determining whether a triangle formed by the current vertex together with the first vertex and the previous vertex intersects said view volume;
    (B) if the triangle intersects said view volume, (i) processing the vertex data defined for the current vertex together with any unprocessed vertex data defined for the first vertex or the previous vertex; (ii) generating vertex data for new vertices on the boundary of said view volume by interpolation from the vertex data for the vertices of the edge intersecting said view volume; and (iii) sending the vertex data generated for the new vertices to said display processor;
    (C) if the triangle does not intersect said view volume, proceeding to the next vertex without processing any vertex data.

20. In a computer graphics system in which a graphics primitive representing a polygon within a defined view volume is converted to a shaded image by a display processor responsive to successively provided vertex coordinates and shading values, said polygon having an ordered set of vertices each defined by vertex data, each successive pair of vertices defining an edge of the polygon, the vertex data for each vertex including vertex coordinates and normal vector values which may be processed to generate a shading value, a method of rendering said polygon comprising the steps of:

(a) dividing said polygon into triangular subareas, each vertex of said subareas being a vertex of said polygon; and (b) for each subarea intersecting said view volume;
  (1) processing the vertex data defined for the vertices of said subarea to generate shading values for said vertices;
  (2) generating a clipped subarea representing the intersection of the unclipped subarea with said view volume, by testing a first vertex of said unclipped subarea against said view volume and by processing the remaining vertices in accordance with the results of the test of said first vertex, and generating vertex data for any newly created vertices of said clipped subarea by interpolation from the vertex data defined for the vertices of the edge intersecting said view volume; and
  (3) sending the vertex data for said clipped subarea to said display processor to generate a shaded image of said clipped subarea.

21. A method as in claim 20 in which said polygon is processed on a vertex-by-vertex basis, vertex data for a given vertex of said polygon being processed for the first subarea including said vertex and being retained for any subsequent subarea including said vertex.

22. A method as in claim 21 in which said triangular subareas share the first vertex of said polygon as a common vertex.

23. A method as in claim 22 in which vertex data for the first vertex of a polygon is stored at a first location, vertex data for the most recently processed vertex of said polygon is stored at a second location, and vertex data for the vertex of said polygon currently being processed is stored at a third location.

24. A method as in claim 23 in which vertex data is transferred from said third location to said second location upon completion of processing of a vertex of said polygon.

25. A method as in claim 24 in which vertex data for a first new vertex is stored at a fourth location and vertex data for a second new vertex is stored at a fifth location.

26. In a computer graphics system in which a graphics primitive representing a polygon within a defined view volume is converted by a display processor to a shaded image for display on a display surface, said polygon having an ordered set of vertices each defined by vertex data, each successive pair of vertices defining an edge of the polygon, apparatus for rendering said polygon comprising:
  (a) means for dividing said polygon into triangular subareas, each vertex of said subareas being a vertex of said polygon;
  (b) means for generating clipped subarea representing the intersections of said subareas with said view volume, said means for generating testing vertices after a first vertex according to the results of the first vertex testing, said generating means generating vertex data for any newly created vertices of said clipped subarea by interpolation from the vertex data defined for the vertices of the of the edge intersecting said view volume; and
  (c) means for sending the vertex data for said clipped subarea to said display processor to generate a shaded image of said polygon.

* * * * *

UNITED STATES PATENT AND TRADEMARK OFFICE
CERTIFICATE OF CORRECTION

PATENT NO. : 5,357,599

DATED : October 18, 1994

INVENTOR(S) : William L. Luken

Page 1 of 2

It is certified that error appears in the above-indentified patent and that said Letters Patent is hereby corrected as shown below:

Col. 1, line 8, delete "tile" and insert --the--;
      line 9, delete "tile" and insert --the--;
Col. 5, line 56, delete "ally" and insert --any--;
Col. 8, line 60, delete "XS" and insert --X5--;
Col. 10, line 32, delete "Zm," and insert --Zm+--;
Col. 12, line 6, delete ",nay" and insert --may--;
      line 57, delete ",napped" and insert --mapped--;
Col. 13, line 55, delete "4'4" and insert --4X4--;
Col. 18, line 58, delete "(F)" and insert --(P)--;
Col. 21, line 66, delete "substrate", insert --subareas--;
Col. 22, line 46, delete "coordinate", insert --coordinates--;

UNITED STATES PATENT AND TRADEMARK OFFICE
CERTIFICATE OF CORRECTION

PATENT NO. : 5,357,599
DATED : October 18, 1994
INVENTOR(S) : William L. Luken

It is certified that error appears in the above-indentified patent and that said Letters Patent is hereby corrected as shown below:

Col. 23, line 18, delete "15" and insert --14--;
        line 35, before "axes", insert --coordinate--;
Col. 24, line 47, delete "unclipped", insert --undefined--;
        line 61, after "retained", delete ".";
Col. 25, line 8, delete "24" and insert --23--;
Col. 26, line 6, delete "subarea", insert --subareas--; and
        line 12, delete "subarea", insert --subareas--.

Signed and Sealed this

Twenty-ninth Day of April, 1997

Attest:

BRUCE LEHMAN

*Attesting Officer*    *Commissioner of Patents and Trademarks*